(12) United States Patent
Wiggins et al.

(10) Patent No.: US 7,738,381 B2
(45) Date of Patent: **\*Jun. 15, 2010**

(54) FLOW CONTROL OF FRAME BASED DATA OVER A SYNCHRONOUS DIGITAL NETWORK

(75) Inventors: David William Wiggins, Belfast (GB); John Paul Russell, Sawbridgeworth (GB); David Michael Goodman, St. Albans (GB); Christopher David Murton, Chelmsford (GB); Christopher Thomas William Ramsden, Hertford (GB); James Shields, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/053,307

(22) Filed: Mar. 21, 2008

(65) Prior Publication Data

US 2008/0165888 A1    Jul. 10, 2008

Related U.S. Application Data

(63) Continuation of application No. 09/203,853, filed on Dec. 2, 1998, now Pat. No. 7,369,496.

(51) Int. Cl.
*H04L 12/56* (2006.01)
(52) U.S. Cl. .................................................. 370/235
(58) Field of Classification Search ........................ None
See application file for complete search history.

(56) References Cited

U.S. PATENT DOCUMENTS 6,167,029 A  *  12/2000  Ramakrishnan ............. 370/235

(Continued)

Primary Examiner—Anh-Vu Ly
(74) Attorney, Agent, or Firm—Barnes & Thornburg LLP

(57) ABSTRACT

A transmission apparatus and a method for operating the apparatus comprises means for controlling flow of frame based data transmitted from a local frame based data channel interface over a synchronous digital network. The method of operation comprises the transmitter receiving frame based data at a first rate whereafter a buffer is configured to receive the frame based data. A data amount threshold level for the buffer is pre-determined whereafter, with respect to the threshold level, an amount of transmitted frame based data that has been received is monitored. In response to monitoring the amount of data received, a signal, in the form of a pause frame, is generated wherein the signal is configurable to adapt the rate of transmission from the frame based data channel interface. Working in conjunction with the transmission means there is also provided a receiver for controlling flow of frame based data, received from a synchronous digital network, to a frame based data channel interface. The receiver is configured to receive the frame based data at a first rate whereafter a buffer is configured to receive the frame based data. Upon pre-determining a data amount threshold level for the buffer an amount of frame based data received is monitored with respect to the threshold level. In response to monitoring the amount of data received, a signal is generated in the form of a pause frame, wherein the pause frame signal is configurable to adapt the first transmission rate of the frame based data over the synchronous digital network to a second rate. In this way, the rate of transmission from a local Ethernet switch may be controlled and the rate of receipt of Ethernet based frame data from a synchronous digital network may be controlled. In the latter case pause frames may be incorporated into one or more synchronous digital hierarchy virtual containers.

20 Claims, 11 Drawing Sheets

U.S. PATENT DOCUMENTS 6,487,198 B1 * 11/2002 Pierson, Jr. ................. 370/356
6,496,519 B1 * 12/2002 Russell et al. ............... 370/465
7,369,496 B1 * 5/2008 Wiggins et al. ............. 370/235

* cited by examiner

FLOW CONTROL OF FRAME BASED DATA OVER A SYNCHRONOUS DIGITAL NETWORK

FIELD OF THE INVENTION

The present invention relates to a method and apparatus for effecting flow control of data communications frame based data over a synchronous digital network and particularly, though not exclusively, relates to controlling the rate of flow of IEEE 802.3 data communications frame based data over a synchronous digital hierarchy network.

BACKGROUND TO THE INVENTION

In the applicant's co-pending patent application entitled "Frame Based Data Transmission Over Synchronous Digital Hierarchy Network", there is disclosed a method of carrying frame based data over a synchronous digital network, such as a synchronous digital hierarchy (SDH) network or the US counterpart "SONET" network. The applicant's aforementioned disclosed system may provide OSI layer 2 switching functionality (which was only previously available in prior art local area networks) extended over a geographical coverage area which has been historically considered to have been provided only by a prior art wide area network.

In order to accommodate data communications frame based data, which is characterised by its own set of data rates and control data characteristics, and to contain such frame based data in conventional synchronous digital networks, there is a problem that the frame based data communications data rates are not well matched to conventional telecommunication data rates, for example E1, E3, T1, STM-1 data rates. These standard telecommunications interfaces are used by the data communications industry to provide wide area networks formed from point to point links. However, this is inconvenient for data communications service providers since data communications protocols have developed using a completely different set of interfaces and protocols, for example carrier sense multiple access collision detection (CSMA/CD) systems, subject of IEEE standard 802.3, such as the Ethernet which is available in 10 MegaBits/s, 100 megabits/s and 1 gigabits/s versions. Conventional data communications protocols do not match up very well to conventional telecommunications interfaces because of a mismatch in data rates and technologies between conventional data communications and conventional telecommunications.

Several prior art attempts have been made to carry frame based data over telecommunications networks, and are briefly summarized in the applicant's aforementioned co-pending patent application. However, prior art schemes suffer from various disadvantages such as, in certain schemes, a substantial packetization header overhead, which can comprise up to 20% of an SDH packet payload.

SUMMARY OF THE INVENTION

One object of the present invention is to provide the high data rate, high reliability and functionality that is available with conventional local area networks, over a wide area network comprising a long distance high capacity synchronous digital network.

Another object of the present invention is to provide matched data rates, between conventional data communication systems and conventional telecommunication systems, in an efficient manner.

Another object of the present invention is to ensure that data transmitted from a frame based data channel interface to a synchronous digital network is not lost and is reliably and efficiently incorporated into a system of Virtual Containers.

Another object of the present invention is to ensure that information is received reliably and efficiently from a synchronous digital network for delivery to a frame based data channel interface.

A further object of the present invention is to provide a transceiver and a method of operating a transceiver for ensuring reliable and efficient rates of transportation of data between a synchronous digital network and a local frame based data channel interface and vice versa.

According to one aspect of the present invention, there is provided a method of controlling flow of frame based data transmitted from a local frame based data channel interface over a synchronous digital network, comprising steps of:

receiving said frame based data at a first rate;

configuring a buffer to receive said frame based data;

predetermining a data amount threshold level for said buffer;

with respect to said threshold level, monitoring an amount of said transmitted frame based data that has been received; and in response to said step of monitoring said amount of said data received, generating a signal, wherein said signal is configurable to adapt said first rate of transmission from said frame based data channel interface, to a second rate.

Preferably said data is received directly from an Ethernet local area network. In a first preferred embodiment said network comprises a synchronous digital hierarchy (SDH) network, eg. a SONET network. In accordance with ITU-T recommendation G.707. Suitably said step of receiving said frame based data may comprise receiving one or more pause frames generated by a local area network switch. Preferably, said buffer comprises data storage locations configurable to store at least one data frame. Preferably, said buffer has a storage capacity size equal to a number of maximum length Ethernet frames, said number being selectable from the set comprising 4 and 6. Preferably, said buffer is configured as a first in first out (FIFO) queue. Preferably, said buffer is configured as a circular buffer. Preferably, said step of monitoring said amount of transmitted frame based data received, comprises determining if said amount is less than said threshold level. Preferably, said signal is generated and sent to said local interface if said amount of said frame based data received is not less than said threshold level. If said amount of said frame based data received is not less than said threshold level, then a decision to generate said signal maybe made substantially immediately. If said amount of said frame based data is not less than said threshold level, then said signal is transmitted to said local interface upon another frame currently being transmitted to said local interface being completed. Preferably, said signal comprises a pause frame specifying a predetermined time interval for inhibiting further transmissions from said local frame based data channel interface. In a preferred embodiment said buffer comprises, above said threshold level, an amount of data storage capacity equal to the size of two maximum length Ethernet frames.

According to a second aspect of the invention there is provided a method of controlling flow of frame based data, received from a synchronous digital network, to a frame based data channel interface, comprising steps of:

receiving said frame based data at a first rate;

configuring a buffer to receive said frame based data;

predetermining a data amount threshold level for said buffer;

with respect to said threshold level, monitoring an amount of said frame based data received; and in response to said step of monitoring said amount of said data received, generating a signal, wherein said signal is configurable to adapt said first rate of transmission of said frame based data over said synchronous digital network to a second rate.

According to a third aspect of the present invention, there is provided apparatus configurable for controlling flow of frame based data transmitted from a local frame based data channel interface over a synchronous digital network, comprising:

means for receiving said frame based data transmitted at a first rate;

buffering means configurable to receive said frame based data;

means configured for predetermining a data amount threshold level for said buffering means;

means for monitoring an amount of said transmitted frame based data that has been received with respect to said threshold level; and means responsive to said monitoring means, wherein said responsive means is configurable to adapt said first rate of transmission of said frame based data channel interface to a second rate.

Preferably, said means for receiving said frame based data comprises means for receiving one or more pause frames generated by local area network switch. Preferably, said buffer comprises data storage locations configurable to store at least one data frame. Preferably, said buffering means comprises a size equal to a number of maximum length Ethernet frames, said number being selectable from the set comprising 4 and 6. Preferably, said buffering means is configured as a first in first out (FIFO) queue. Preferably, said buffering means is configured as a circular buffer. Suitably, said means for monitoring an amount of said transmitted frame based data received, comprises means for determining if said amount of data received is less than said threshold level.

Preferably, said monitoring means is configured to generate a signal to said responsive means, if said amount of said frame based data received is not less than said threshold level. Preferably, said responsive means, upon receipt of a signal from said monitoring means, is configured to transmit a pause signal. In a preferred embodiment, upon receipt of a signal from said monitoring means, said responsive means is configured to transmit a pause frame upon a current transmission, of another frame to said local interface, being completed. Preferably, said responsive means is configured to generate a pause frame specifying a pre-determined time interval for inhibiting further transmissions from said local frame based data channel interface. Suitably, said means configured for pre-determining the data amount threshold level for said buffering means, is configured such that said threshold level is set to identify if only an amount of data storage capacity equal to the size of two maximum length Ethernet frames remains available for storing data.

According to a fourth aspect of the present invention, there is provided apparatus configurable for controlling flow of frame based data, received from a synchronous digital network, to a frame based data channel interface, comprising:

means for receiving said frame based data at a first rate;

buffering means configurable to receive said frame based data;

means for predetermining a data amount threshold level for said buffering means;

means for monitoring an amount of said frame based data received, with respect to said threshold level; and means responsive to said monitoring means, wherein said responsive means is configurable to adapt said first rate of transmission of said frame based data over said synchronous digital network to a second rate.

According to a fifth aspect of the present invention, there is provided a method of controlling flow of frame base data over a synchronous digital network, comprising steps of:

receiving first frame based data, at a first rate of transmission, from a data source comprising a frame based data channel interface;

receiving second frame based data, at a second rate of transmission, from a data source comprising said synchronous digital network;

configuring buffering means to receive said frame based data from said data sources;

in respect of said buffering means, associating a data amount threshold level with at least one of said frame based data sources;

with respect to a said threshold level, monitoring an amount of data received from said associated data source; and in response to said step of monitoring said amount of said data received with respect to its associated threshold level, generating a signal to adapt said rate of transmission of said data from said associated data source.

In a preferred method said frame based data channel interface is configured to receive data directly from an Ethernet switch. In a first preferred embodiment said buffering means comprises a first buffer for receiving said data from said frame based data channel interface and a second buffer for receiving said data from said synchronous digital network. Preferably said buffer comprises two distinct buffers, each of said buffers comprising a size equal to a number of maximum length Ethernet frames, said number being selectable from the set comprising 4 and 6. Preferably said step of associating a data amount threshold level with at least said first or said second frame based data, comprises associating said data from said frame based data channel interface with a first buffer having a predefined threshold level and said data from said synchronous digital network with a second buffer having a predefined threshold level. Preferably said step of monitoring said amount of transmitted frame based data received, comprises determining if said amount is less than a said associated threshold level. Preferably said generated signal is generated if said amount of said frame based data received with respect to a said threshold level is not less than said associated threshold level. Preferably said step of generating a signal, comprises generating and transmitting a pause frame specifying a pre-determined time interval for inhibiting further transmissions from said frame based data channel interface. Preferably said generated signal is incorporated into one or more virtual containers. Preferably said step of generating signal, comprises generating a pause frame specifying a pre-determined time interval for inhibiting further transmission from said synchronous digital network. Preferably if said amount of said frame based data received is not less than its said associated threshold level, then a pause frame is generated and upon transmission of a current frame being completed, said pause frame is transmitted.

According to a sixth aspect of the present invention there is provided apparatus configurable for controlling flow of frame based data over a synchronous digital network, comprising:

means for receiving first frame based data at a first rate of transmission, from a data source comprising a frame based channel interface;

means for receiving second frame based data transmitted at a second rate, from a data source comprising said synchronous digital network;

buffering means configurable to receive said frame based data from said data sources;

means configurable to associate said buffering means with a data amount threshold level for at least one of said frame based data sources;

means for monitoring, with respect to a said threshold level, an amount of data received from said associated data source; and means configurable to generate a signal to adapt said rate of said data from said associated data source, wherein said signal generation is responsive to said monitored amount of said data received with respect to its associated threshold level.

Preferably said frame based data interface is configured to receive data directly from an Ethernet switch. Preferably said buffering means comprises a first buffer for receiving said data from said frame based data channel interface and a second buffer for receiving data from a said synchronous digital network. Preferably said buffering means comprises two distinct buffers, wherein each of said buffers comprises a size equal to a number of maximum length Ethernet frames, said number being selectable from the set comprising 4 and 6. Preferably said means configurable to associate a data amount threshold level with at least said first or said second frame based data comprises means for associating said data from said frame based data channel interface with a first buffer having a predetermined threshold level and means for associating said data from said synchronous digital network with a second buffer having a predetermined threshold level. Preferably said monitoring means comprises means for determining if said amount of data is less than a said threshold level. Preferably said means configurable for generation of a signal, generates said signal if said amount of said frame based data received is not less than said threshold level. Preferably said means for generating a signal comprises means for generating a pause frame specifying a pre-determined time interval for inhibiting further transmissions from said frame based data channel interface. Preferably said means for generating a signal, is configured to incorporate said signal into one or more virtual containers. Preferably said means configurable for generation of a signal, comprises generating a pause frame specifying a pre-determined time interval for inhibiting further transmissions from said synchronous digital network. Preferably said means configured to monitor said amount of transmitted frame based data received, comprises means for determining if said amount is less than said threshold level.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

In the OSI 7 layer Reference Model layer 2 is normally known as the data link layer which lies immediately above the physical layer (layer 1) and immediately below the network layer (layer 3). Each of layers 1 to 3 comprises exchange of data units, which are respectively bits, frames and packets. Thus the data link layer, of concern in the present application, comprises exchange of data frames. A primary task of the data link layer is to take a raw transmission facility and transform it into a line that appears free of undetected transmission errors to the network layer above. The aforementioned task is performed by the sender of the data breaking up the input data into data frames which typically comprise a few hundred or a few thousand bytes. Following break up of the input data, a sender is required to transmit the frame sequentially. Furthermore, the frames in a particular system, will have an upper maximum limit in terms of their size but different frames may in general have different sizes. Since the physical layer merely accepts and transmits a string of bits without any regard to meaning or structure, it is up to the data link layer to create and distinguish frame boundaries. The terms, bits, frames and packets used herein, are to be interpreted with respect to the above definitions.

Figure 1:
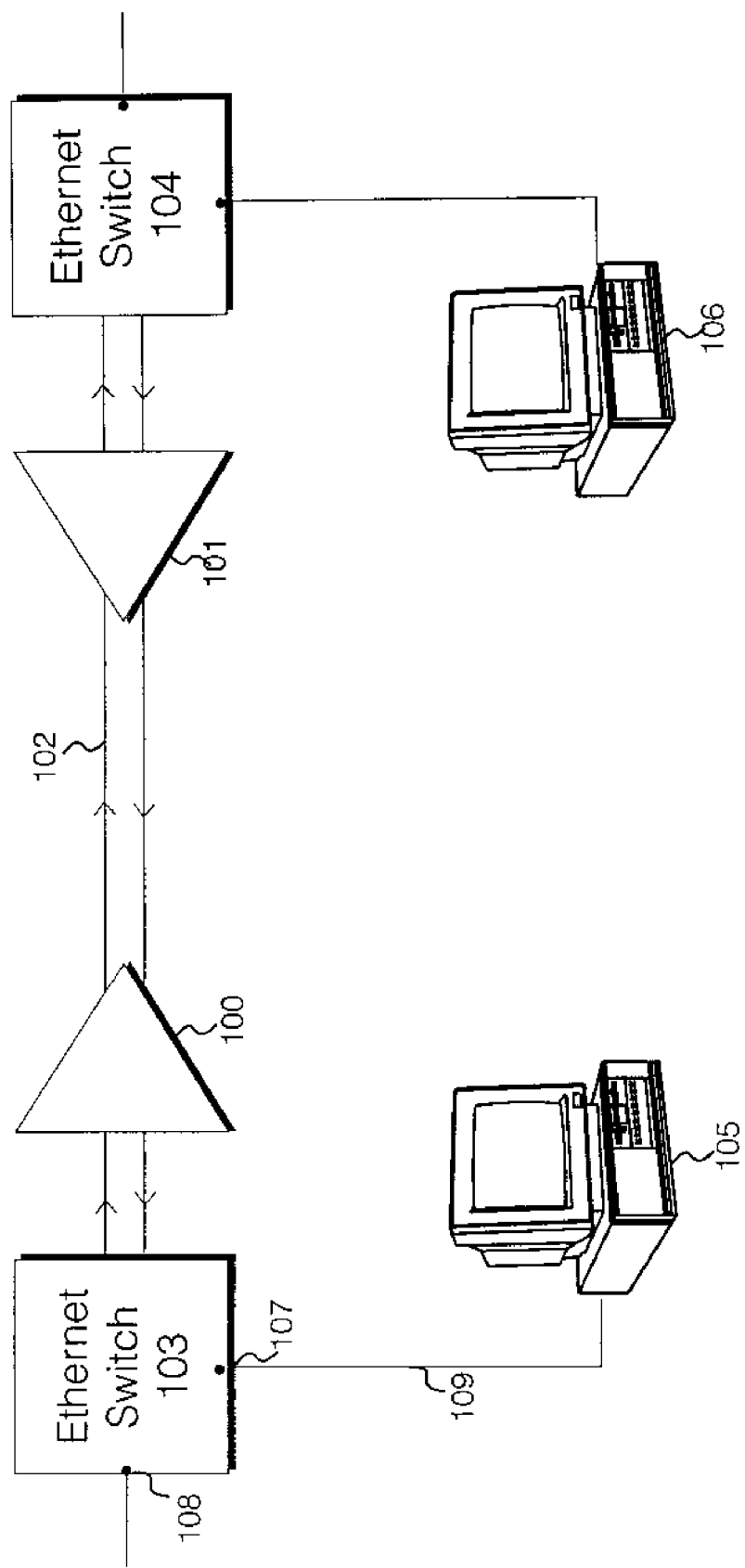
FIG. 1 illustrates schematically elements of a first embodiment data network carrying a frame based data channel over a synchronous data channel.

Referring to FIG. 1 herein, there is illustrated schematically elements of a first embodiment simplified data network according to the present invention. A frame based data communications system carried over a synchronous digital network is provided by the arrangement shown in FIG. 1. In the specification, the terms synchronous network and synchronous digital network are used to refer to a time division multiplex synchronous transport layer in LSI layer 1. Conventional examples of such networks include the synchronous digital hierarchy (SDH) of ITU-T recommendation G70.X, which incorporates synchronous optical network (SONET) systems specified in ITU-T recommendation G.709 and related recommendations. The data network elements in the example shown, comprise first and second synchronous digital terminal multiplexers, 100, 101 connected to each other by a suitable communications link 102 such as an optical fibre communications link. For the purposes of the present invention, devices 100, 101 may alternatively be called mapper units. Communications link 102 may comprise an SDH communications link comprising one or more SDH channels. SDH link 102 is schematically illustrated as comprising two distinct channels, but in practice may comprise a single bi-directional communications channel or a plurality thereof. Connected to and communicating with mapper unit 100 is a first link for providing communications with switch 103 and connected to and communicating with mapper unit 101 is a second link for providing communication with switch 104. Switches 103 and 104 may each comprise an IEEE 802.3 switch (such as an Ethernet switch) and said switches are respectively connected to various devices, via an IEEE 802.3 local network, including computational devices such as devices 105 and 106 respectively. Ethernet switches 103 and 104 each may typically comprise a plurality of Ethernet ports such as ports 107 and 108 associated with switch 103. Thus, in the example shown, device 105 communicates with port 107 via communication link 109. Each of first and second computer devices 105, 106, first and second Ethernet switches 103,104 and first and second mapper units 100, 101 comprise a frame based data channel interface. Thus, in the example shown, first and second computer devices 105 ad 106 communicate frame based data with each other over the Ethernet switches 103, 104 and over SDH communications link 102. Communication between multiplexers 100, 101 is via a synchronous digital network protocol, for example the SDH protocol or synchronous optical network protocol (SONET) as specified in ITU-T recommendation G.709 and related recommendations. Communication between devices 105, 106 and the respective Ethernet switches 103, 104 is by a conventional data frame based data communications protocol such as carrier sense multiple access collision detection (CSMA/CD) protocol, or any other protocol subject of IEEE standard 802.3. Multiplexers 100, 101 may each be considered to comprise a payload mapping function configured to map Ethernet frame based data into one or more concatenated SDH virtual containers (VC's), and a rate modification function for effecting flow control of frame based data, transmitted from an Ethernet switch 103, 104 over synchronous digital network 102. Details regarding the payload mapping function are provided in the applicants co-pending application entitled "Payload Mapping in Synchronous Networks" and thus this function will not be further described herein. Conversion of rates of transmission of SDH frames along communications link 102 and Ethernet data frames communicated between a multiplexer 101 and Ethernet switch 104 or between Ethernet switch 104 and communications link 102 is provided by multiplexer 101. Frames received by mapper 101 may be derived from a plurality of sources. In the simplified example illustrated in FIG. 1 frames may be delivered to mapper 101 from switch 104 and from the system comprising switch 103, mapper 100 and link 102. Similarly multiplexer 100 provides flow control between SDH frame data communicated along link 102 from a data source and Ethernet frame data associated with switch data source 103. In accordance with the present invention, frame rate modification necessitates usage of electronic memory so as to prevent loss of any data frames being processed by a given multiplexer 100,101. Thus for example, if Ethernet switch 103 transmits Ethernet data frames to multiplexer 100 at a higher rate than multiplexer 100 can map said data frames into virtual containers for transmission along link 102, then there is a danger that any allocated memory in a rate adaption means configured on an ASIC chip for example, may currently be filled with resulting loss of Ethernet data frames. The present invention provides a means and apparatus for preventing such loss of data frames.

More generally, the present invention provides a method for and means of ensuring that flow control is provided during conversion of IEEE standard 802.3 data frames into bit-streams, suitable for carriage in virtual containers over a synchronous digital network.

Hereinafter, specific methods and embodiments including the best mode contemplated herein by the inventors will be described in relation to a synchronous digital hierarchy telecommunication system in accordance with ITU recommendation G.709, and an IEEE standard 802.3 frame based data carrier system, a representative example of which is the Ethernet system. However, the general principles, methods and apparatus according to the present invention encompass synchronous digital networks in general, and OSI layer 2 frame base data carrier systems in general, and are not to be considered as restricted to the specific examples of a synchronous digital hierarchy or Ethernet networks.

Figure 2:
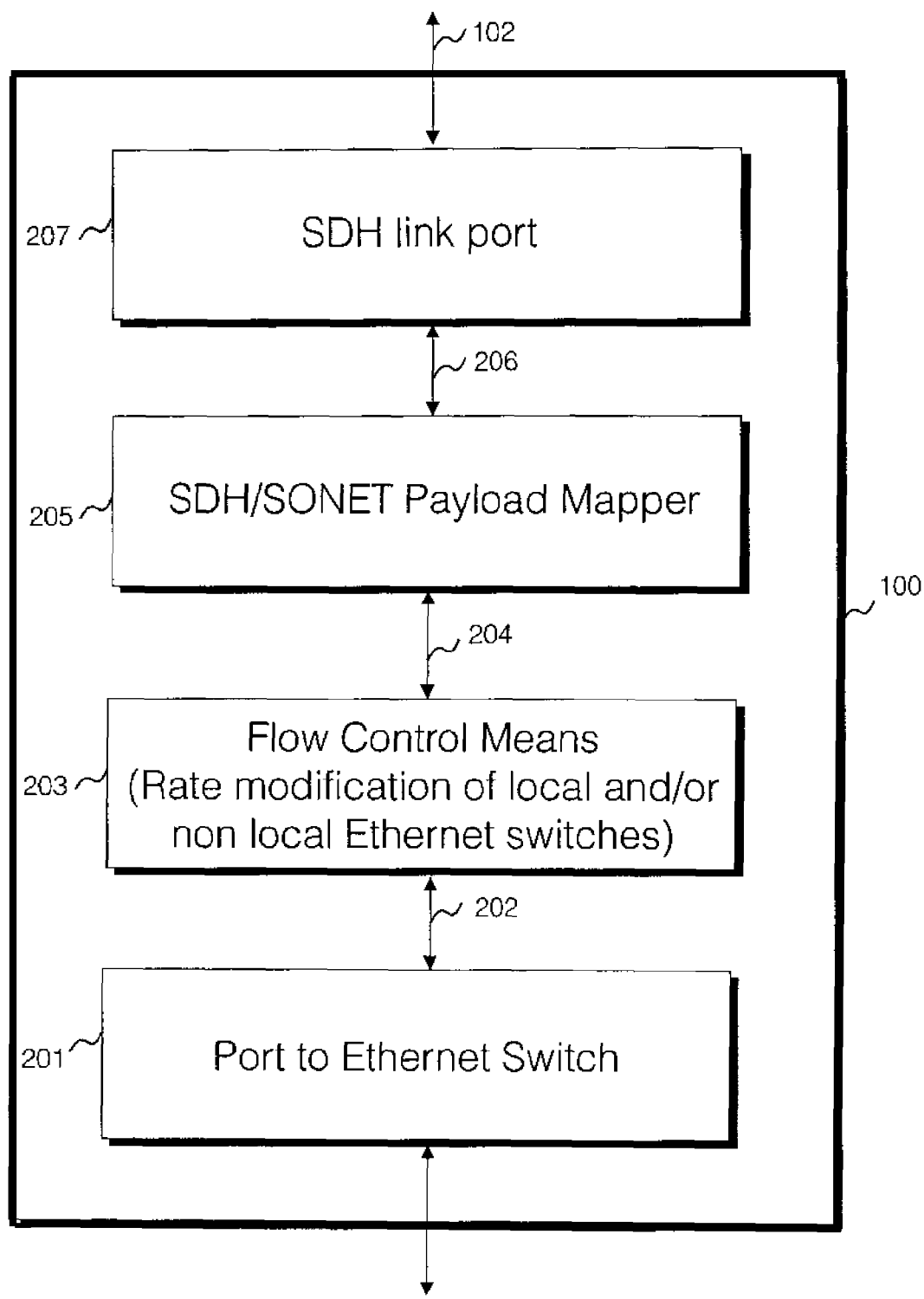
FIG. 2 illustrates schematically a frame based data channel port component of a synchronous digital multiplexer according to a preferred embodiment of the present invention which comprises a flow control means configurable to adapt the rate of transmission of data from both a local IEEE 802.3 switch and one or more remote IEEE 802.3 switches.

Referring to FIG. 2 herein, there is illustrated schematically components of a synchronous digital multiplexer unit 100 comprising a port suitable for connection to an Ethernet switch. The configuration illustrated in FIG. 2 may be considered to be an Ethernet port card incorporated into the synchronous digital hierarchy multiplexer (or a SONET multiplexer) 100 of FIG. 1. Viewed in this latter context, the multiplexer may be considered as having a plurality of tributary interfaces for telecommunications channels, for example, E1, T1, E3, T3, STM-1 and also an interface for frame base data systems such as the Ethernet. Synchronous digital multiplexers 100 and 101 identified in FIG. 1 each comprise the components identified in FIG. 2. An Ethernet switch may be electrically connected to Ethernet port 201 via a bi-directional communication link. Ethernet port 201 communicates via a bi-directional communications link 202 with flow control means 203. Flow control means 203 is configured to affect the rate of transmission of frame based data from an Ethernet switch to synchronous digital link 102. Flow control means 203, in accordance with the present invention, is configured to control both the rate of transmission from a local Ethernet switch and also the rate of receipt of transmissions from one or more remote Ethernet switches. Flow control means 203, via bi-directional communications link 204, is configurable to communicate with SDH/SONET payload mapping means 205. Payload mapping means 205 is configured to communicate with SDH link port 207, via bi-directional communications link 206. SDH link port 207 communicates with bi-directional communications link 102. In the preferred embodiment, communications link 102 comprises a synchronous digital hierarchy link of the type identified in FIG. 1. Payload mapping means 205 is configured to identify the start and end boundaries of each Ethernet data frame being received from flow control means 203 placing said Ethernet frame in Virtual Containers for transportation across link 102 and similarly is configured to extract packet data frames from synchronous bit streams received from SDH link port 207. Thus, the exact nature of processing being performed by units 203 and 205 depends to some extent on whether data is being received from synchronous digital communications link 102 or from a local Ethernet switch connected to Ethernet port 201. Synchronous digital multiplexer 100 is suitable for incorporation in many types of networks including a wide area network, a metropolitan area network or the internet/ worldwide web for example. Greater detail regarding the functionality of payload mapping unit 205 are disclosed in the applicant's co-pending patent application entitled "Payload Mapping in Synchronous Networks".

Figure 3:
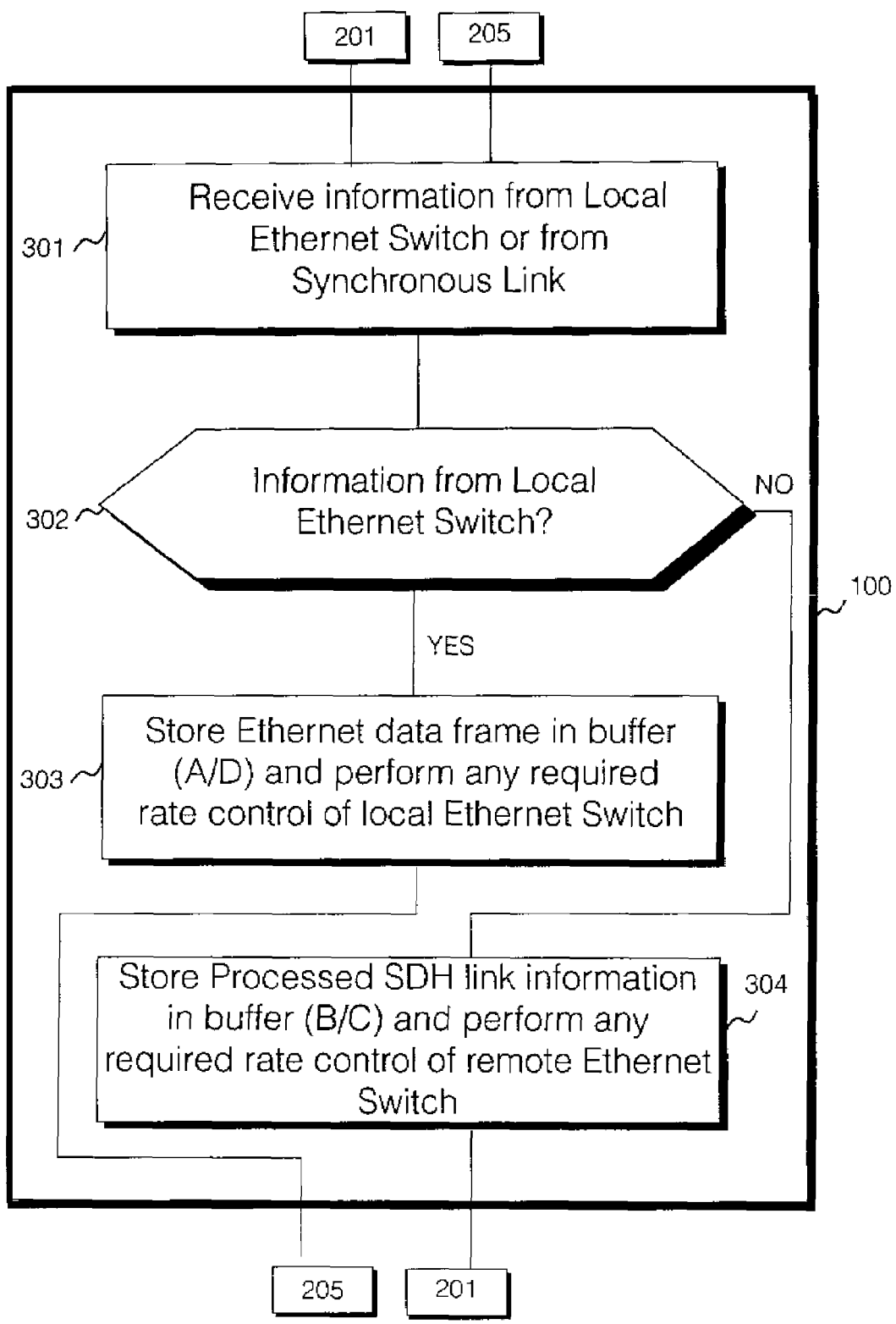
FIG. 3 details high level processing steps performed by the flow control means identified in FIG. 2.

High level processing performed by flow control means 203 identified in FIG. 2, is further detailed in FIG. 3. As identified above, flow control means 203 is configurable to receive information derived from either a local Ethernet switch, or from a remote Ethernet switch via synchronous digital link 102. At step 301 information comprising one or more Ethernet data frames may be received from either a local Ethernet switch or from synchronous digital link 102. Following step 301 control is passed to step 302, wherein a question is asked as to whether the information received at step 301 is from a locally connected Ethernet switch. If this question is answered in the affirmative then control is passed to step 303 wherein the Ethernet data frames received are stored in a buffer comprising electronic memory. Additionally, any processing with respect to rate control of the local Ethernet switch may also be performed by processing means 303. Following step 303 control is passed to SDH/SONET payload mapping unit 205 as identified in FIG. 2. However, the question asked at step 302 may be answered in the negative to the effect that Ethernet frame based data has been received from SDH/SONET payload mapper 205 which in turn will have received said data from link 102. If the question asked at step 302 is answered in the negative then control is passed to step 304, wherein the Ethernet data received over synchronous digital link 102 and processed by mapper 205, is stored in a buffer. At step 304 any required processing in terms of adapting the rate of transmission of the particular remote Ethernet switch from which Ethernet frame based data is received at step 301 is effected. In accordance with the present invention, both the first and second buffers identified above, may be configured in a variety of ways. However, the inventors of the present invention have determined two optimized embodiments which will be described herein later on.

Figure 4:
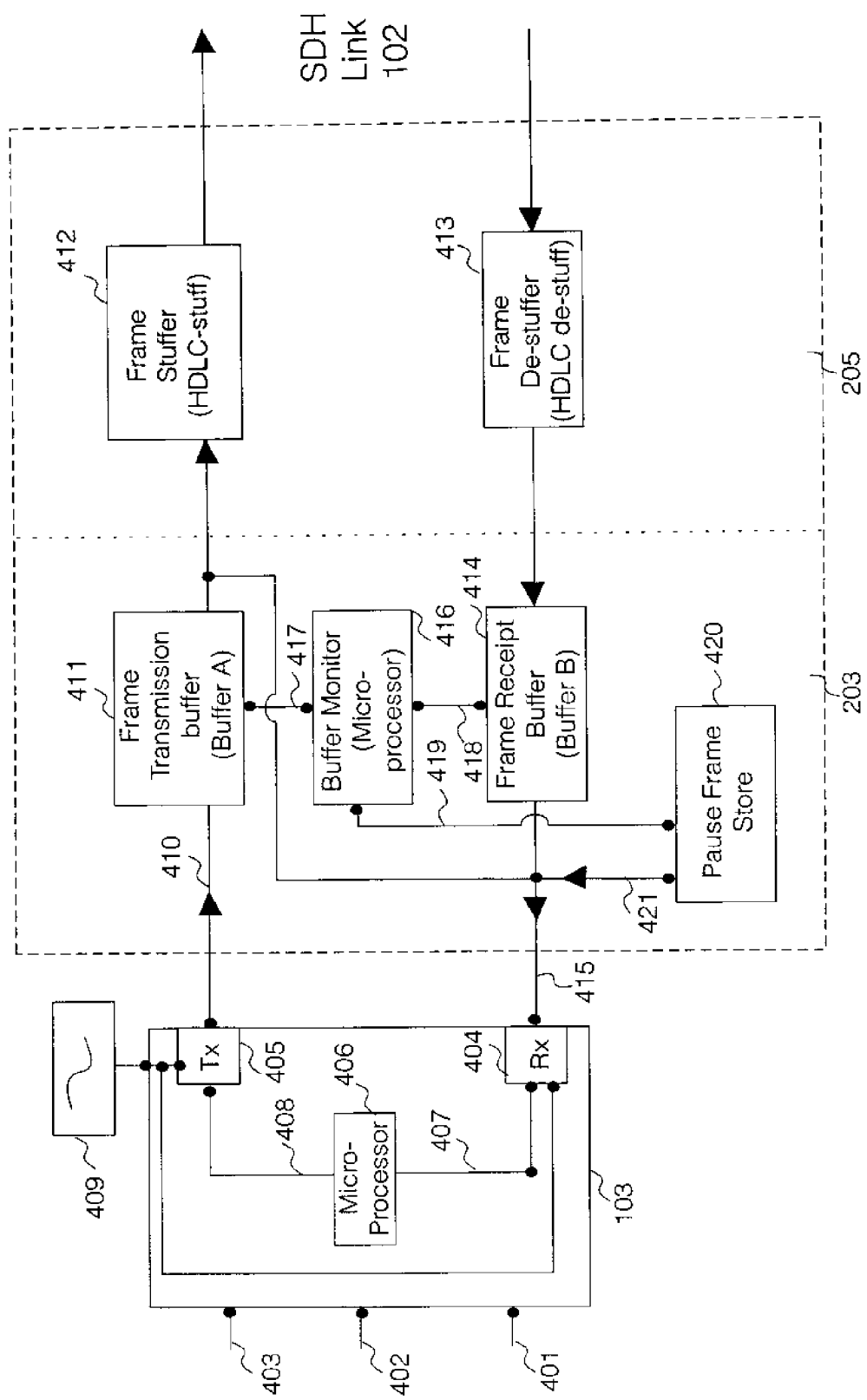
FIG. 4 illustrates schematically a block diagram of the main components of the flow control means and SDH/SONET payload mapper identified in FIG. 2, the flow control means comprising a pair of buffers A and B.

FIG. 4 schematically illustrates in block diagram form, processing units comprising a flow control means 203 and payload mapping means 205 and their inter-relationship with a local prior art Ethernet switch 103 and a synchronized digital link 102. Thus flow control means 203 and payload mapping means 205 may be considered to be comprised within, or associated therewith with, synchronous digital multiplexer 100 as identified in FIG. 1. Switch 103 is a conventional IEEE 802.3 switch such as an Ethernet switch comprising a plurality of local Ethernet ports 401, 402 and 403 each configurable for facilitating connection to a hardware device. Switch 103 is configurable to enable connection to be made with multiplexer 100 which in turn may communicate with synchronized digital link 102. Thus, switch 103 has a port 404 for receiving information derived from link 102 and a port 405 configurable for transmitting information across link 102. The interface between Ethernet switch 103 and rate control means 203 may comprise a gigabit medium independent interface (Gmii) for 1 gigabit rate, a medium independent interface (Mii) for 10 Megabits or 100 Megabits per second rates or a reduced medium independent interface (Rmii). Ports 404 and 405 are controlled by microprocessor 406 via electrical communication lines 407 and 408 respectively. Additionally, the rate of operation of ports 404 and 405 may be controlled by pre-setting a local oscillator 409 as is known in the art. Oscillator 409 may typically be set at 10 MBits per second, 100 MBits per second or 1 GBits per second. For a given Ethernet switch the rate that oscillator 409 is set at may be substantially permanent unless it is deliberately changed thereafter for example. In accordance with the invention, data may be transmitted from port 405, under control of microprocessor 406, to rate control means 203. Thus, Ethernet frame based data is transmitted along communication link 410 to frame transmission buffer (buffer A) 411. Buffer 411 is configurable so that if transmission from port 405 is running at a relatively high rate, then Ethernet data frames received by means 203 may be stored before further processing by stuffing means (a High Data Link Control Stuffing function, HDLC stuff) 412 of payload mapper unit 205. Buffer 411 is required so that the received Ethernet based data frames are not lost if the rate of transmission of said frames is such that HDLC stuffing means 412 cannot process the Ethernet based data frames at a fast enough rate. HDLC byte stuffing means 412 is effectively configured to process, on a byte by byte basis, the Ethernet data frames received so that start and end of frame boundaries may be identified and also so that any data values having the value of a start and end of frame value are labeled to enable a receiving entity to decipher start/end information from actual data. HDLC byte stuffing means 412 thereafter processes Ethernet based data frames received from buffer 411 and transmits said data across SDH link 102 as a serial bit stream within one or more Virtual Containers. Payload mapper 205 additionally comprises a HDLC byte stuffing unit (comprising a HDLC-stuff function) 413 for receiving Ethernet based frame data across link 102. Upon deciphering start of frame and end of frame deliminators from the serial bit stream received, the data is transferred to frame receipt buffer (herein designated buffer B) 414. Buffer 414 is configurable to store received SDH packet data frames before they are transferred thereafter via communications link 415 to local Ethernet switch receiving port 404.

Operation of frame transmission buffer 411 and frame receipt buffer 414 is controlled by a microprocessor, known herein as a buffer monitor 416. Buffer monitor 416 effects control of buffer 411 via control line 417 and similarly effects control of frame receipt buffer 414 via control line 418. In response to determining (via control line 417) an excessive rate of transmission being received by buffer 411, buffer monitor 416 may issue a control signal along control line 419 to pause frame store 420. Pause frame store 420 may comprise a memory suitable for storing a pause frame and in response to receiving a control signal along control line 419 (from buffer monitor 416) a pause frame may be transmitted along the control line 421 to communications link 415, link 415 connecting frame receipt buffer 414 and Ethernet switch receiver port 404. A pause frame issued in this way is transmitted to receiver port 404 so as to instruct microprocessor 406 of switch 103 to pause (that is prevent or possibly reduce) further transmission of Ethernet data frames from port 405 for a predetermined time interval. Buffer monitor 416 is also configured to detect excessive rates of Ethernet based frame data being received by frame receipt buffer 414. Thus, buffer monitor 416 monitors frame receipt buffer 414 via control line 418. Upon detecting excessive receipt of SDH Ethernet based data packet frames in buffer 414, buffer monitor 416 may transmit a signal along control line 419 to pause frame store 420 whereafter pause frame store 420 is configured to issue a pause frame along control line 421 to the communications link configured between frame transmission buffer 411 and frame stuffing means 412. In this way, excessive rates of receipt of information across SDH link 102 may be reduced via a pause frame being incorporated into the bit stream released by frame stuffing means 412 across SDH link 102. In the case of the synchronous digital link comprising an SDH link, then a pause frame required to be transmitted over link 102 may be incorporated into one or more Virtual Containers. A single Virtual Container or a plurality of Virtual Containers may be referred to as a system of Virtual Containers.

Figure 5:
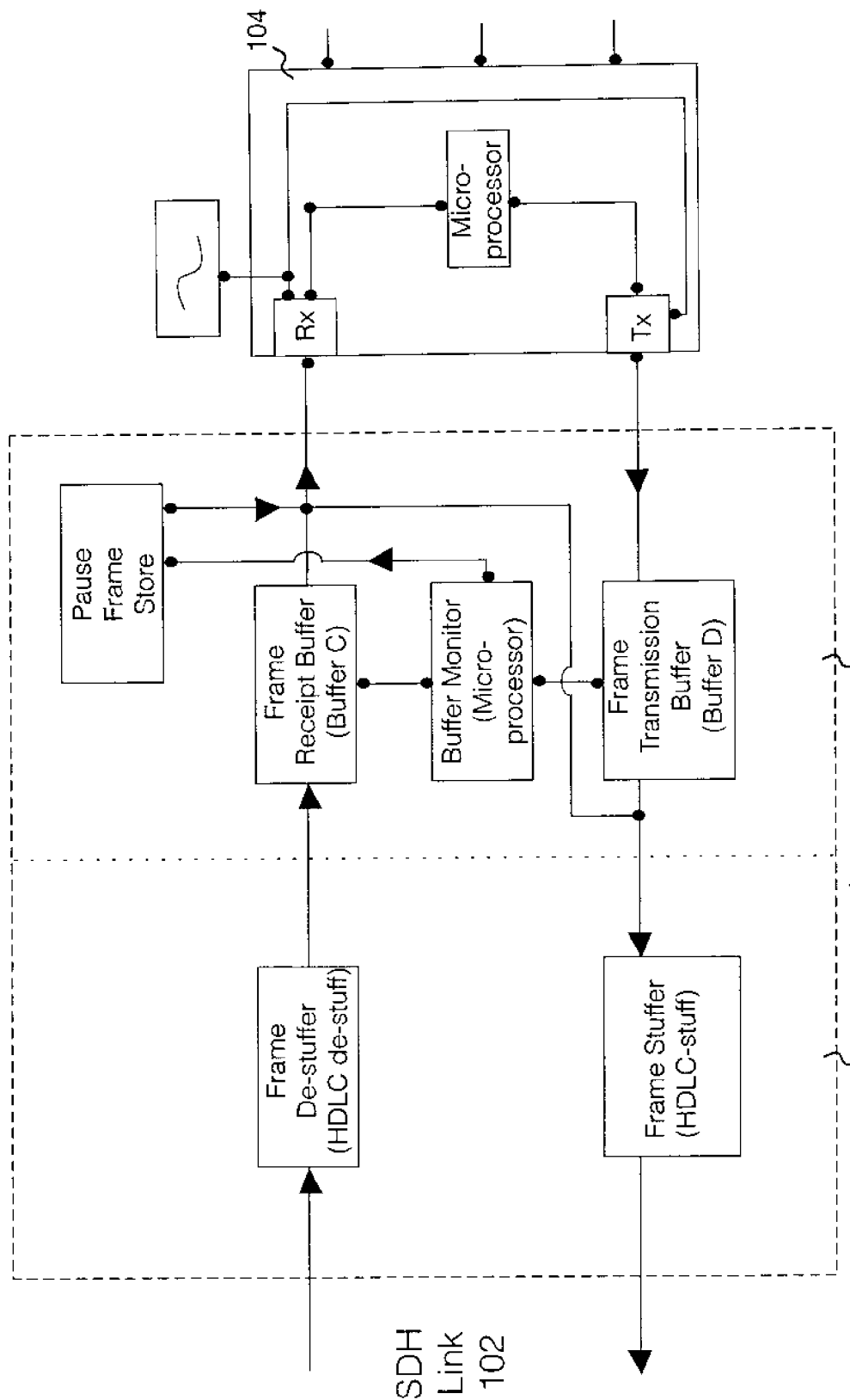
FIG. 5 illustrates apparatus of the type identified in FIG. 4, but which is situated at a distant end of the link identified in FIG. 4 and forming the interface to a remote IEEE 802.3 switch.

FIG. 5 schematically illustrates in block diagram form, a local Ethernet switch connected to a synchronous digital multiplexer, the switch representing switch 104 identified in FIG. 1. Thus, synchronous digital multiplexer 101 is connected to Ethernet switch 104. In terms of the embodiment identified in FIG. 1, Ethernet switch 104 represents a remote switch in relation to Ethernet switch 103. Similarly, multiplexer 101 represents a remote multiplexer associated with remote Ethernet switch 104. The processing units associated with switch 104 and their operation therein, are substantially the same as described for local Ethernet switch 103 identified in FIG. 4. Similarly, processing units associated with multiplexer 101 may be substantially identical to those identified in and described for FIG. 4. Thus, in the preferred embodiment the operation of multiplexer 101 and switch 104 may be substantially the same as that described for corresponding units identified in FIG. 4 and thus they will not be further described. However, those skilled in the art will recognize that the simplified communications network identified in FIG. 1, comprising two local area networks communicating via synchronous digital link 102, is not to be construed as limiting the invention in any way. Thus, the communications network identified in FIG. 1 may, more realistically, comprise a considerably more complex communications network (a wide area network or the internet, for example) comprising a much greater number of Ethernet switches communicating over a plurality of synchronous digital links of the type 102. Furthermore, a given synchronous digital link may in fact comprise a much larger number of communicative channels than one or two.

Figure 6:
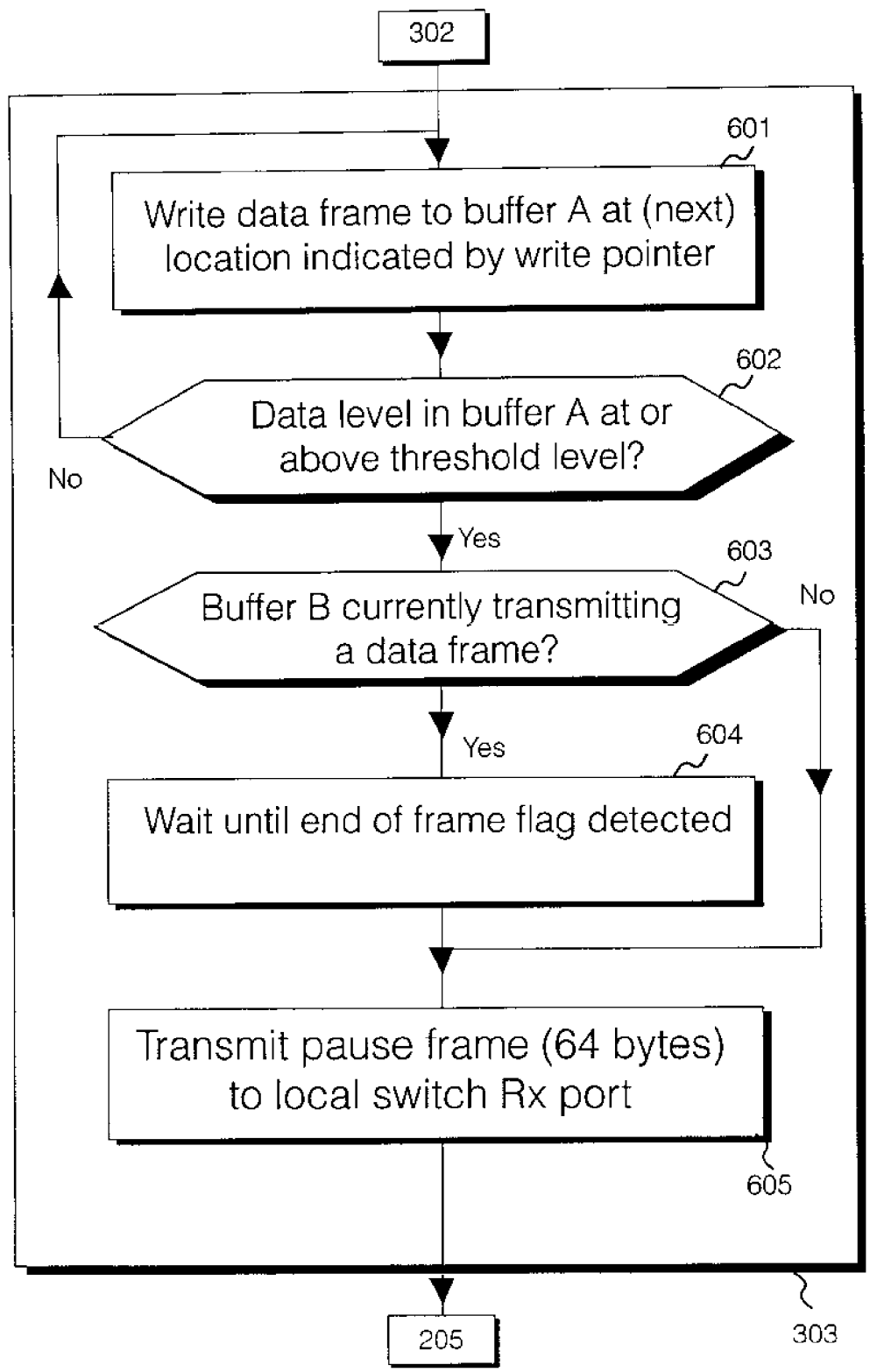
FIG. 6 details processing steps performed by the local rate control unit identified in FIG. 3.

Step 303 in FIG. 3 relating to effecting flow control means 203 to undertake any required rate control (rate adoption) of a local Ethernet switch is further detailed in FIG. 6. Steps identified in FIG. 6 are undertaken by buffer monitor 416 as identified in FIG. 4. At step 601 Ethernet frame based data, received along communication line 410, is written to frame transmission buffer 411 at the next location indicated by a pointer known as the write pointer. Upon having written the data to the next location in the buffer, buffer monitor 416 is configured to increment the write pointer so as to cause it to point to the next available location in the frame transmission buffer. In this way, the next received data frame will be stored in the next available memory location. Following completion of step 601, control is passed to step 602 wherein buffer monitor 416 is configured to ask a question as to whether the data level in buffer A (buffer 411, the frame transmission buffer) is at or above a predetermined threshold level. By predetermined it is meant that flow control means 203 has previously been configured (initialized) such that buffer A is associated with a pointer or other suitable device indicating how much data the buffer is currently storing relative to a predefined data amount threshold level. By how much data is currently being stored it is not simply meant the number of IEEE 802.3 data frames that are currently stored in the buffer because the size of the frames varies from one frame to another. By size it is meant the number of bytes and thus by how much data is currently being stored at a given time it is meant the number of bytes of data currently stored from received frames. If the response to the question asked at step 602 is in the negative to the effect that the buffer does not currently hold an amount of data equal to (or greater than) the predetermined threshold level, then control is returned to step 601. However, if the response to the question asked at step 602 is in the affirmative to the effect that the number of IEEE 802.3 data frames held in buffer A is not less than the amount represented by the threshold level associated with buffer A, then control is passed to step 603. At step 603, buffer monitor 416 is then configured to determine (or decide) that a pause frame should be sent to local switch 103. Thus, monitor 416 transmits a signal along control line 419, to store 420 so as to cause store 420 to generate a pause frame which is ready to be transmitted. Thereafter, buffer monitor 416 is configured to determine whether buffer B (the frame receipt buffer 414) is currently transmitting a data frame. To determine the answer to the question identified at step 603, buffer monitor 416 effectively issues a query signal along control line 418 to buffer B. Upon the question asked at step 603 being answered in the affirmative, to the effect that buffer B is currently transmitting an Ethernet based data frame, then control is passed to step 604 wherein buffer monitor 416 is configured to wait until the end of frame flag (otherwise known as a marker or frame deliminator), for the data frame currently being transmitted, is detected. Following step 604 buffer monitor 416 is configured, at step 605, to issue a signal along control line 419 to pause frame store 420 so as to transmit a pause frame along control line 415 to local Ethernet switch receiver port 404. Alternatively, if the question asked at step 603 is answered in the negative then control is passed directly to step 605, wherein buffer monitor 416 is configured to issue a signal along control line 419 to pause frame store 420 so as to substantially immediately effect generation of and transmission of a pause frame to local switch 103. In either case, the pause frame generated by pause frame store 420 is directed along control line 421 and control line 415 to local Ethernet switch receiver port 404. The questions asked at steps 602 and 603 respectively may thus be considered to render flow control means 203 to be responsive to both the amount of data currently held in buffer A and whether or not buffer B is currently transmitting a data frame.

Figure 7:
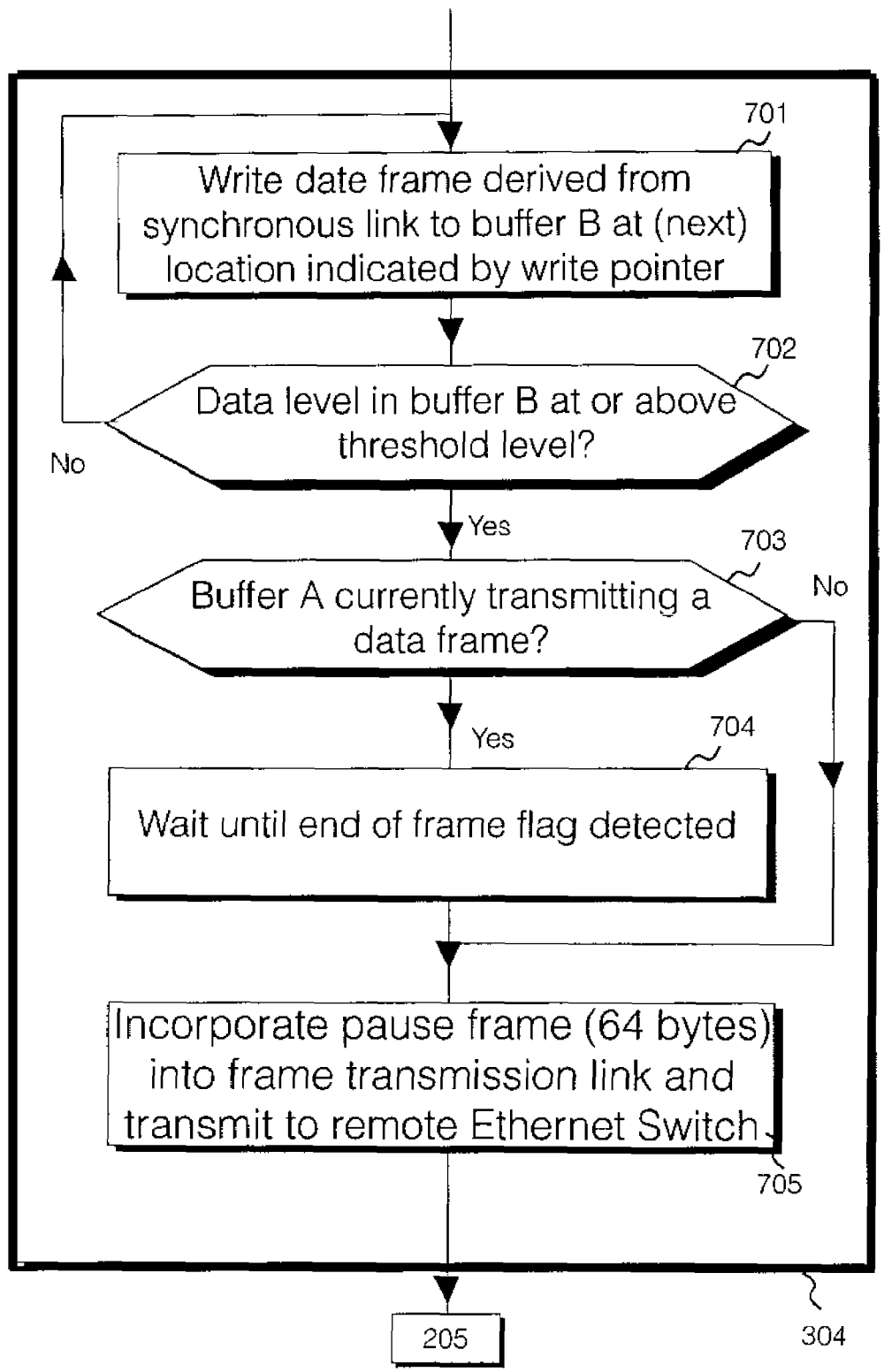
FIG. 7 illustrates processing steps performed by the rate control means of FIG. 3 which is configured to effect rate control of a remote Ethernet switch.

Control of the rate of transmission of remote Ethernet switches by flow control means 203 is undertaken by process 304 identified in FIG. 3. Step 304 is further detailed in FIG. 7. At step 701 buffer monitor 416 is configured to effect writing of Ethernet based data frame derived from synchronous link 102, received via frame de-stuffing means 413, to buffer B (buffer 414) at the next available location pointed to by a suitably configured write pointer. The next available location for writing a given data frame to is indicated by suitably configuring a write pointer wherein upon the given memory location being pointed to being filled, the pointer is incremented so as to point to the next available memory location. Following step 701 control is passed to step 702 wherein buffer monitor 416 is configured to ask a question as to whether the data level in buffer B is at or above a predetermined threshold level. As was the case for buffer A described above, the predetermined threshold level may be configured by use of a pointer or other suitable marker device configured to monitor the amount of data (in bytes) that buffer B is currently holding relative to a threshold reference data amount level. If the response to the question asked at Step 702 is in the negative to the effect that buffer B is currently only holding an amount of data which is less than the threshold level, then control is passed back to step 701 whereafter the question of step 702 is asked again. However, if the question asked at step 702 is answered in the affirmative to the effect that the buffer has filled to the threshold level then buffer monitor 416 sends a signal along line 419 to effect pause frame store 420 to generate (ie. prepare) a pause frame so as to be ready for transmission. Thereafter, buffer marker 416 is configured to ask a further question at step 703 as to whether the frame transmission buffer (buffer A) is currently transmitting a data frame to frame stuffing means 412. The question asked at step 703 is effected by buffer monitor 416 sending a query signal along control line 417 to buffer A with a suitable signal being returned to represent a yes or a no. If the response to the question asked at 703 is in the affirmative, then control is passed to step 704 wherein buffer monitor 416 is configured to wait until the end of frame flag, for the current data frame being transmitted, is detected. The questions asked at steps 702 and 703 respectively render flow control means 203 to be responsive to the amount of data held in buffer B and whether or not buffer A is currently transmitting a frame. By frame flag it is meant a marker representing the end of the frame. Following step 704 control is passed to step 705 wherein buffer monitor 416 is configured to substantially immediately issue a signal along control line 419 to pause frame store 420 so as to cause pause frame store 420 to transmit the aforementioned prepared pause frame along control line 421 whereafter the pause frame is inserted into the data stream (eg. in a Virtual Container or a plurality of Virtual Containers) being transmitted between frame transmission buffer 411 and frame stuffing means 412. Alternatively, if the question asked at step 703 is answered in the negative to the effect that buffer 411 is not currently transmitting a data frame, then control is passed directly to step 705 wherein buffer monitor 416 is configured to substantially immediately effect pause frame store 420 to generate a pause frame and transmit this for appropriate incorporation into the communication link between frame transmission buffer 411 and frame stuffing means 412. Step 704 is required so that transmission of a pause frame does not interrupt any particular data frame being transmitted from frame transmission buffer 411 to frame stuffer means 412. The process detailed in FIG. 7 may be considered to be a feedback mechanism in that a pause frame generated at step 705 effectively prevents further transmission of Ethernet data frames from a transmission port of a remote Ethernet switch 104 as identified in FIGS. 1 and 5. In the preferred embodiment, further transmission from remote switch 104 is prevented for a predetermined time whereafter a further transmission of Ethernet data frames is resumed. In an alternative embodiment, it may be preferable to configure the pause frame generated at step 705 to effectively temporarily reduce the rate of transmission from switch 104 rather than to completely prevent further transmission for a predetermined time. Finally it will be appreciated by those skilled in the art that the processes identified in FIGS. 6 and 7 may be configured to operate substantially in parallel in real time such that control of the rate of transmission of Ethernet frames from a local switch may be effected substantially simultaneously with rate control of a non local Ethernet switch. Furthermore the rate control of a remote Ethernet switch may comprise rate control of a plurality of remote Ethernet switches and this may, in certain applications, comprise blanket control of such switches or individual control depending upon a particular network operator's requirements. If rate control is required to individually control a given remote Ethernet switch, then flow control means 203 may be configured with more complex processing steps so as to be selective in terms of which Ethernet switch, at any given time, is to be rate controlled and by how much.

Figure 8:
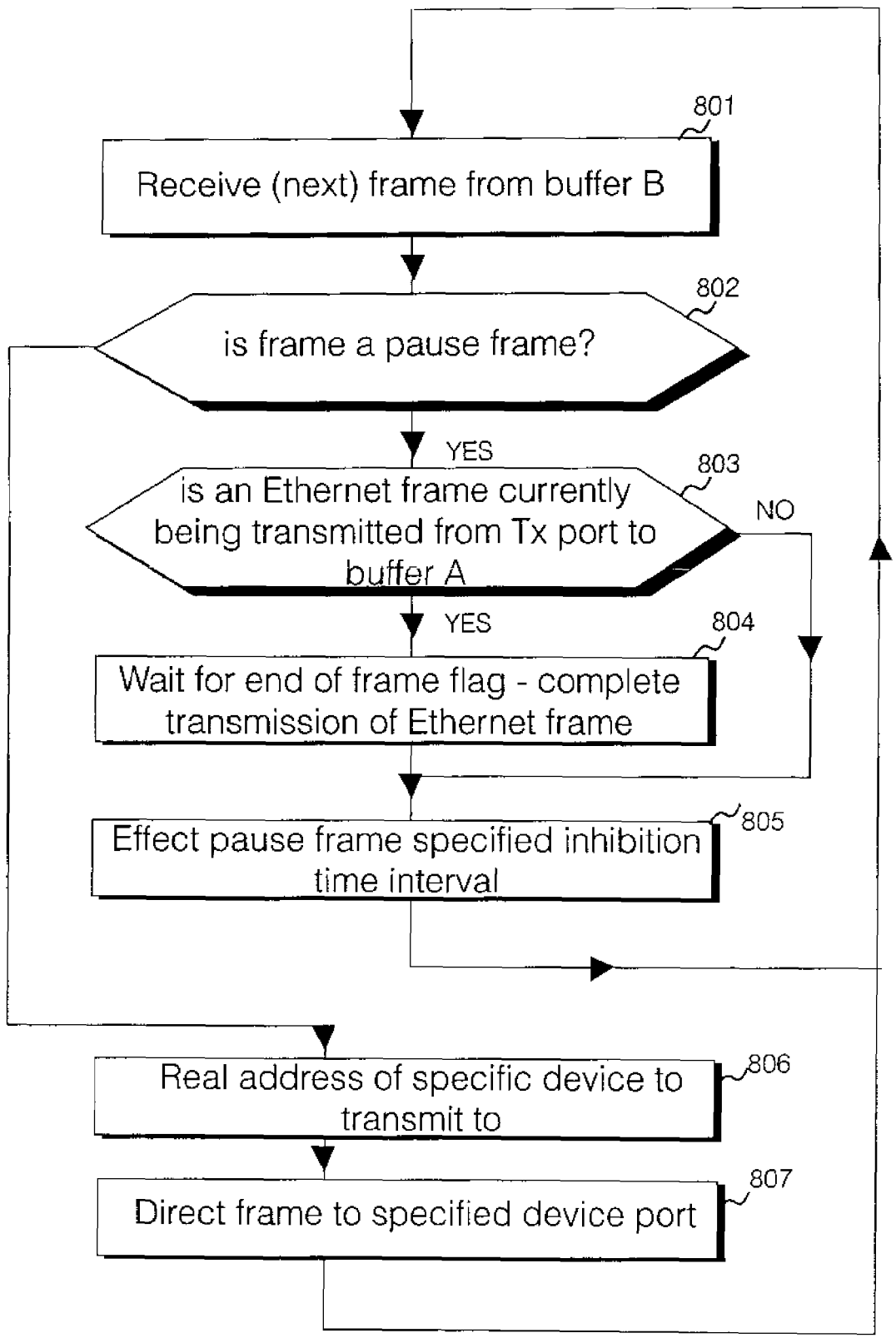
FIG. 8 details processing steps performed by an IEEE 802.3 switch of the type identified in FIGS. 4 and 5, said processing being in response to receiving data frames from a rate control means of the type identified in FIG. 4 or 5.

For completeness, the steps performed by a given Ethernet switch in response to receiving data transmitted from a frame receipt buffer of a flow control means 203, are further detailed in FIG. 8 with reference to FIG. 4. At step 801 switch 103 for example is configured to receive (the next) frame from frame receipt buffer 414 (buffer B). The frame is received by frame receipt port 404 whereafter microprocessor 406 is configured to ask a question at step 802 as to whether the frame received is an Ethernet based data frame or a pause frame. If the question asked at step 802 is answered in the affirmative then control is passed to step 803 wherein a further question is asked by microprocessor 406 as to whether an Ethernet based data frame is currently being transmitted from the transmission port (port 405) to the frame transmission buffer 411 of flow control means 203. If the question asked at step 803 is answered in the affirmative then control is passed to step 804 wherein microprocessor 406 is configured to wait for an end of frame flag to be detected in the transmission emanating from transmission port 405. In other words, microprocessor 406 is configured to allow a given frame transmission from port 405 to be completed before intervening. Following step 804 control is passed to step 805 wherein the frame received at step 801 and confirmed to be a pause frame at step 802 is executed. In other words, at step 805 the pause frame is executed so that the specified transmission inhibition time interval (specified by the received pause frame) is invoked upon Ethernet switch 103. This may be configured such that microprocessor 406 is inhibited (for a specified time) from effecting further transmission of data frames from port 405. Following step 805 control is returned to step 801 wherein microprocessor 406 is configured to wait for the next frame to be received from frame receipt buffer 414 of mapping means 100.

Other than the processing thread of an Ethernet switch as discussed above, other processing routes as possible as identified in FIG. 8. Thus, following step 801 control is passed to step 802 wherein the question asked as to whether the frame received is a pause frame may be answered in the negative. If the frame received at step 801 is not a pause frame then microprocessor 406 is configured to detect this and thereafter pass control directly to step 806 wherein microprocessor 406 is configured to read the address of the specified device to which the Ethernet data frame is to be transmitted. In other words, a data frame received along communications line 415 is required to be directed by microprocessor 406 to one of a plurality of local Ethernet ports 401, 402 or 403 as identified in FIG. 4. Following step 806 control is directed to step 807 wherein microprocessor 406 is configured to direct the frame to the specified device port. Following step 807 control is returned to step 801 wherein microprocessor 406 is configured so as to be ready to receive the next frame transmitted from buffer B to receiving port 404.

Following steps 801 and 802, control may be passed to step 803 via the question asked at step 802 being answered in the affirmative and wherein if an Ethernet frame is not currently being transmitted from transmission port 405, then the question asked at step 803 is answered in the negative. In this case control is passed thereafter to step 805 wherein the pause frame detected at step 802 is executed so as to prevent further transmission of Ethernet based data frames for the specified time interval. Following step 805 control is returned to step 801 wherein microprocessor 406 is configured to wait to receive the next frame from frame receipt buffer 414.

Figure 9:
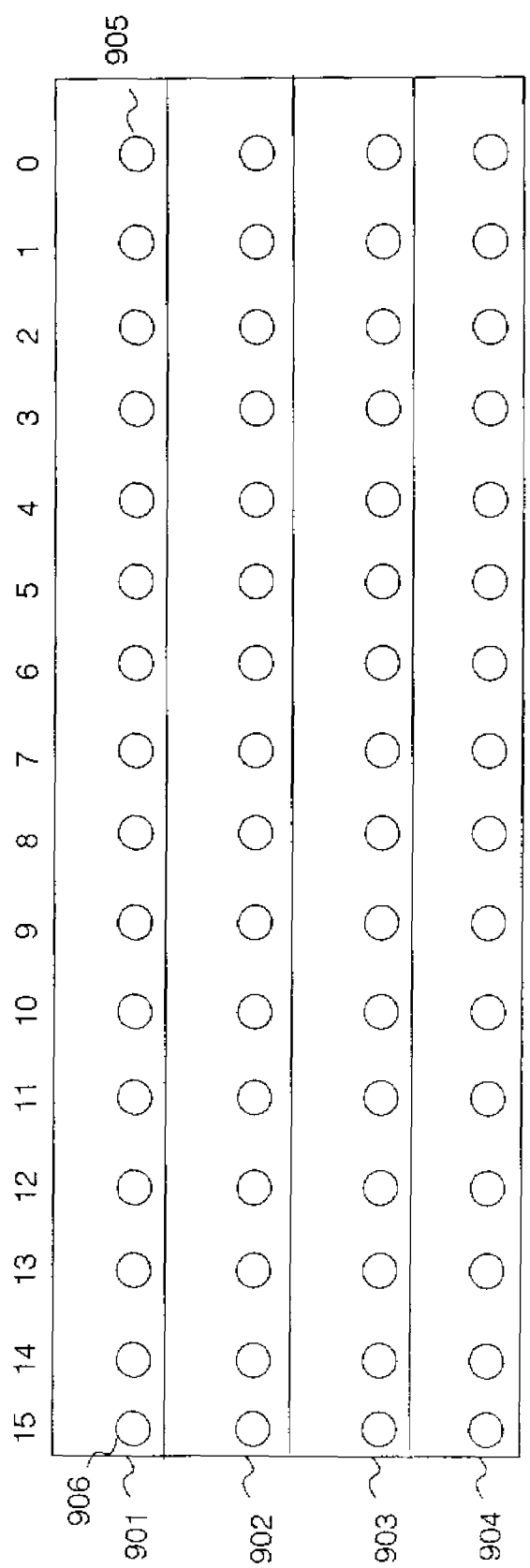
FIG. 9 schematically illustrates a portion of a pause frame of the type issued by a rate control means of the type detailed in FIGS. 2 to 8, the portion specifying a pause time interval.

In the best mode contemplated herein by the inventors, a pause time portion of a pause frame configured for use with the invention is schematically illustrated in FIG. 9. The pause frame pause time portion represents a known IEEE 802.3X pause structure comprising 8 bytes arranged contiguously. However, for illustrative purposes, the contiguous sequence of bytes is illustrated in FIG. 9 as four separate rows, 901-904 respectively each comprising two bytes. Each schematic row represents a distinct field in terms of the configuration of the pause time portion of a given pause frame. Thus, row 901 comprises 16 bits (2 bytes) from least significant bit 905 to most significant bit 906. Particular pause times utilized by a particular system may be predetermined as described earlier, in which case the values of the 16 bits identified in row 901 will be accorded the desired values. In the particular example shown, starting from the least significant bit 905, the first 3 bits are respectively 0, 1 and 1 with the remaining more significant bytes having values of 0 thereafter. Thus, if the unit of pause time is specified to be in microseconds for example then the value represented in field 901 would correspond to a pause time of 6 microseconds. In many situations it is more appropriate to measure the pause time interval in units of pause quanta, wherein each pause quantum is equal to 512 bit times (64 byte times) of the particular implementation of a rate control means being used. Because the pause time is specified by the 16 bits associated with field 901, then the range of possible pause time values is 0-65535 pause quanta. Thus, if the value of the pause time is set to 0 then pause frames will effectively never be issued even if flow control is active. By a pause quantum being equal to 512 bit times it is meant that a pause quantum is effectively equal to the time that it takes a particular switch to transmit 512 bits (64 bytes). A pause frame of this type is known in the art of Ethernet switching wherein a given Ethernet switch is required to inhibit transmission from certain devices which are flooding its buffers. Thus, in accordance with Ethernet switching standards, a second field is provided, field 902 known as a reset value which normally may have a default value comprising the least significant bit having the value one with all more significant bits having the value 0. Field 903 is known in the art as "which reset" and this field may take various control values of various control parameters depending upon the particular implementation. Similarly, field 904 comprises control information related to inhibition of access to particular read and write registers. In the particular example shown in FIG. 9, both fields 903 and 904 comprise bytes having all bit values set equal to zero. The standard IEEE 802.3X flow control regime provides a means of reducing network congestion in networks that are operating in full duplex mode, via prior art special pause frames. It is symmetric, so that devices which can transmit pause frames must also respond to received pause frames. Thus, the present invention may be configured to utilize pause frames as described in the IEEE 802.3X standard, the pause frames of which, comprise: a 48 bit multicast destination address; a 48 bit source address; a 16 bit length/type field; a 16 bit pause opcode; a 16 bit pause time (as described above) which specifies a non-zero number of pause quanta, a pause quantum being defined as 512 bit times; padding as required or desired; and a 32 bit frame check sequence (cyclic redundancy check word).

Padding is required to make up the frame to a minimum of 64 bytes. The standard allows pause frames longer than 64 bytes to be discarded or interpreted as valid pause frames. Further details with respect to implementation of pause frames are readily obtainable by those skilled in the art and the configuration of a given pause frame structure for a given application may be similarly readily achievable by any suitably skilled person.

With respect to the present implementation, the size of the buffers associated with a given local Ethernet switch, such as for example buffer A and buffer B of FIG. 4 comprised within multiplexer 100 is, in general, required to be optimized if the processing units related to flow rate control are to be incorporated upon an application specific integrated circuit (ASIC) chip for example. For standard pause frames of the type identified in FIG. 9, the pause quantum is 64 bytes the number of pause quanta required being selectable using a 16 bit value, ie. up to 65536 blocks of 64 bytes. This is equivalent to 2739 Ethernet longest frames. As described above, the pause frame itself is at least 64 bytes long. The longest possible Ethernet frame comprises 1531 bytes and the shortest possible Ethernet frame comprises 64 bytes. Thus, a typical Ethernet frame will have a size which varies between 64 bytes and 1531 bytes.

Figure 10:
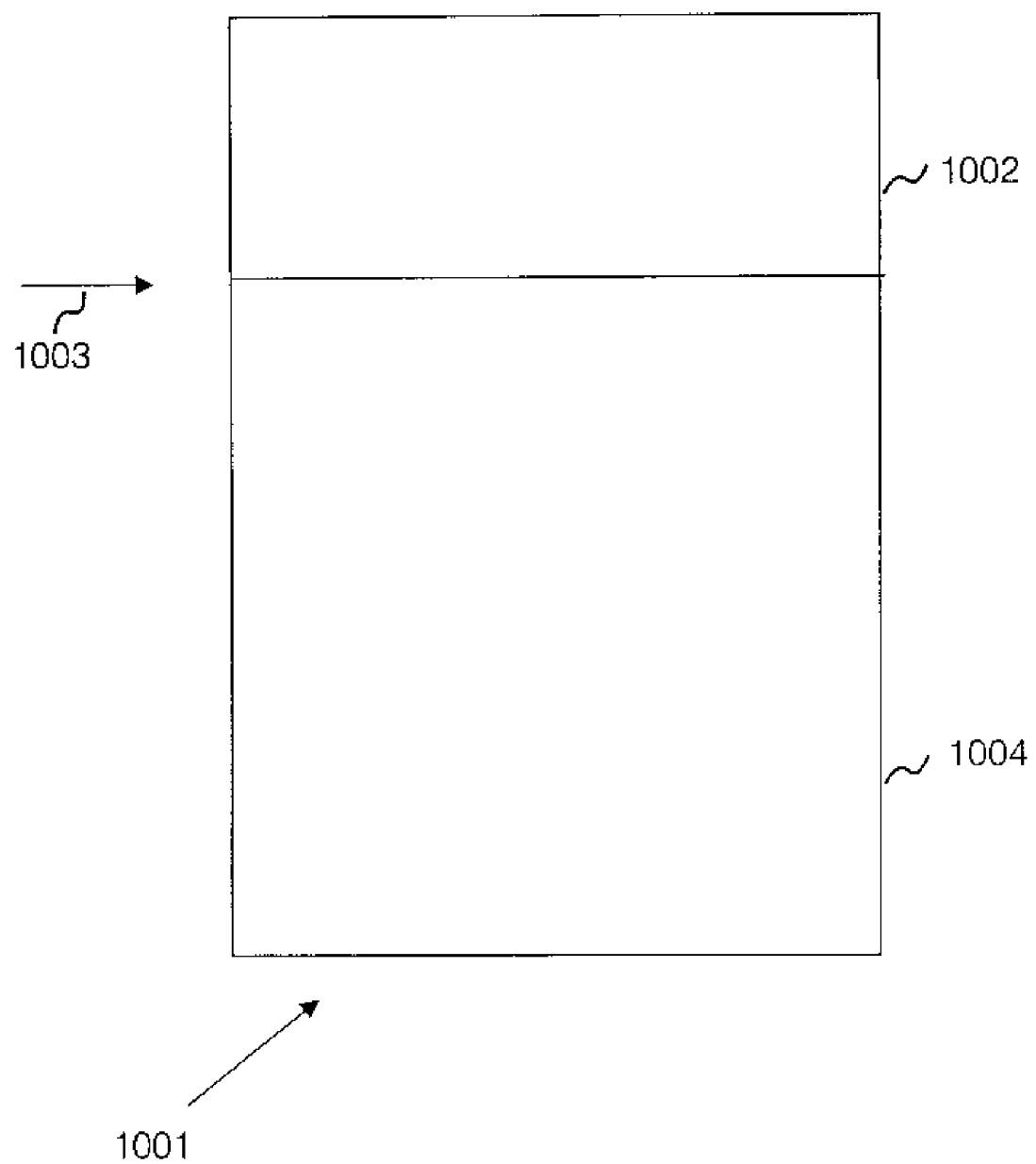
FIG. 10 schematically illustrates a first preferred embodiment of any of is buffers A-D configured in the flow control means as identified in FIG. 4 or 5.

An analysis with respect to the size of buffers A and B in FIG. 4 has led to the following preferred embodiments of said buffers. In a first preferred implementation, shown in FIG. 10, a buffer such as buffer A or B is required to comprise a data storage location, 1001 comprising a data storage capacity equal to six longest Ethernet frames. In other words buffer A and buffer B are found, in a first preferred embodiment, to optimally each have a size corresponding to six longest Ethernet frames (9186 bytes) for all Ethernet port data rates, so as to retain maximum efficiency in terms of usage of the SDH link. The length of the pause frame time required for different network implementations will vary with different combinations of oscillator rates, but will always be the same for any particular combination of preset oscillators. Buffers A and B each comprise two parts, a part 1002 above a predefined port frame trigger threshold 1003 and a part 1004 below the port frame trigger threshold. In FIG. 10, the threshold trigger level is identified for illustrative purposes by arrow 1003. Threshold trigger level 1003 may readily be configured as a pointer, marker or other suitable device. It is found by the inventors herein that, in a first embodiment of a buffer suitable for use in accordance with the invention, that the data storage capacity required above the threshold level comprises a size equal to two longest Ethernet frames and that the data storage capacity required below threshold level 1003 comprises a size equal to four longest Ethernet frames. With this configuration, in the worst case, the portion of the buffer above the threshold level may fill (or thereafter overflow), resulting in the buffer being completely filled in which case data may be lost. Portion 1002 may fill before a given pause frame is effected by Ethernet switch microprocessor 406 identified in FIG. 4. When a pause frame is detected by microprocessor 406 and the pause frame takes effect, the specified pause frame time interval must be configured so that upper data storage portion 1002 empties so that the buffer data level falls to below threshold level 1003 before the switch starts transmitting data 405 again. Optimally a data storage capacity equal to four longest Ethernet frames is found to be required below threshold level 1003. From a brief analysis it may appear appropriate to have a storage capacity equal to just 2 longest Ethernet frames below threshold level 1007, this then giving rise to a situation where no waiting occurs before a given pause frame takes effect. In this case it may appear reasonable to assume that if buffer B in FIG. 4 has just that moment finished receiving two longest Ethernet data frames and processor 406 is not currently waiting for switch 103 to finish transmitting data from port 405 then the level of data held in the buffer will effectively drop by an amount equal to the size of two longest Ethernet frames. This assumption is found to be incorrect and the reason for using a storage capacity equal to four longest Ethernet frames below threshold level 1003 is a consequence of the HDLC (high level data link control) stuff function performed by frame stuffer 412. To summarize, frame stuffing means 412 is configured to insert bytes having the value "00" (in hexadecimal notation) behind all data values in a given Ethernet data frame which have the value of a frame end or frame start identifier. Typically the frame end and frame start identifier will be configured with the value "7E". Thus in theory, a longest Ethernet data frame could comprise data values which coincidentally all have the value of the start or end of frame identifier (the value 7E). It is for this reason that a storage capacity below threshold level 1003 comprising a size equal to four longest Ethernet frames is required to be present below threshold level 1003.

Figure 11:
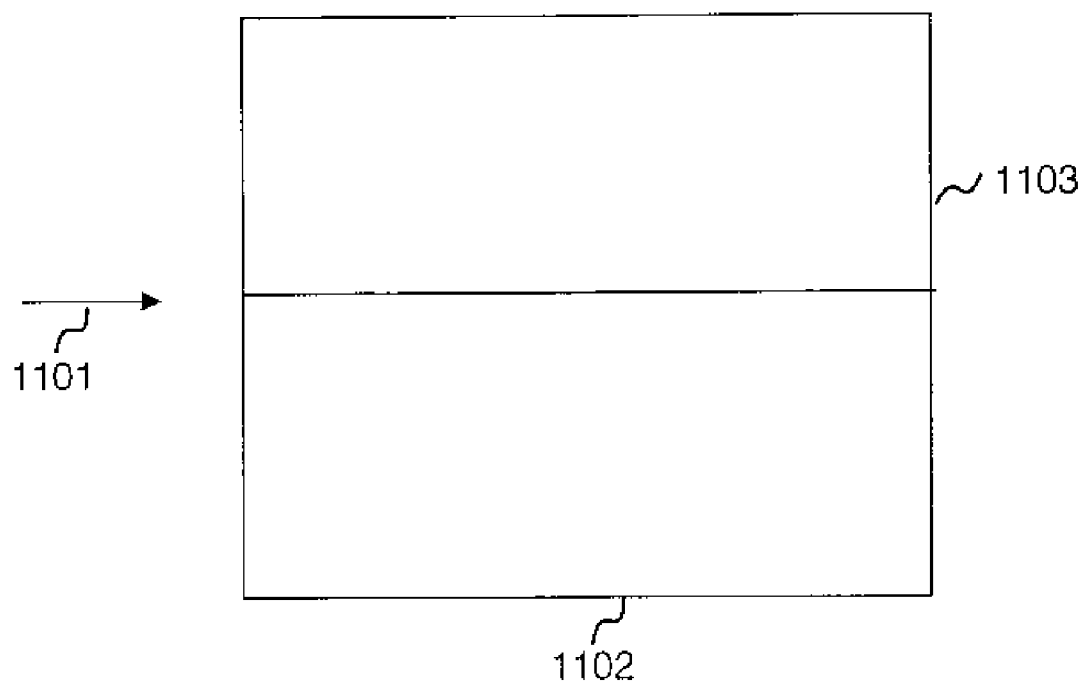
FIG. 11 illustrates, in accordance with the present invention, a best mode configuration for any of buffers A-D in FIGS. 4 and 5.

In the best mode contemplated by the inventors, an alternative configuration of both buffers A and B in FIG. 4 is detailed in FIG. 11. The above mentioned system of inserting "00" following any instances of the start and end of frame flag character (7E Hex) is required to avoid false framing by eliminating any instances of the flag character in the data encapsulated within the frame. As seen above, in the worse case (data is all 7E), the bandwidth requirements are inflated by a factor of two, which in turn renders it necessary to have a data storage capacity equivalent in size to four longest Ethernet frames below threshold level 1003 identified in FIG. 10. Adding the value 00 after each instance of the end or start of frame flag effectively inflates the size of the given data frame by two. To reduce frame inflation of this type, a more sophisticated coding scheme has been developed and is well known to those skilled in the art of such coding. The improved frame inflation reduction scheme is known to those skilled in the art by the title "Consistent Overhead Byte Stuffing" (COBS). The COBS system is based on the idea of breaking up a given Ethernet frame into a sequence of code blocks of maximum length n bytes. The first byte in each code block is the code byte which can be thought of as a pointer to the next code byte. COBS removes the occurrences of the flag pattern in two steps:

1. removing occurrences of 00 octets in the data using code blocks; and
2. replacing any occurrences in the data of the flag pattern 7E with 00.

Further details regarding the COBS coding scheme will not be described herein as they are well known to those skilled in the art. However, in terms of the present invention the best mode is considered to utilize the COBS coding scheme, and with this scheme it is found that the size of the buffers in flow control means 203 may be reduced (that is optimized) to a size equivalent to four longest Ethernet frames as identified in FIG. 11. In this implementation, a threshold level 1101 is required to be set such that a lower portion of the buffer, portion 1102 lies below threshold level 1101 and has a size equal to two longest Ethernet frames. Similarly with respect to portion 1103 above threshold level 1101 it is found that a capacity equal to two longest Ethernet frames is optimal. The pair of buffers identified in the figures (eg. FIG. 4) are thus suitably configured as detailed in FIG. 10 or 11, the best mode being buffers configured in accordance with that detailed in FIG. 11. In either the FIG. 10 embodiment or the FIG. 11 embodiment, data frames will be written to a given buffer data storage location with appropriate implementation of a write pointer and read from the buffer location with appropriate implementation of a read pointer. The buffers may be configured to be read, lowest buffer data storage location first, and written to at the lowest data storage location currently not holding a frame. Alternatively, in accordance with the best mode contemplated by the inventors, each of said buffers may be implemented as a circular buffer. As identified above, if the COBS coding scheme is adopted then the size of each of buffers A & B may be reduced to a size equivalent to four longest Ethernet frames. Given that the longest Ethernet data frame comprises 1531 bytes then the total size of a COBS buffer optimized as detailed in FIG. 11 will be 4×1531 bytes, that is 6124 bytes long.

As discussed above, the storage buffers are preferably configured to have an optimum (that is a minimum) size of either 4 or 6 longest Ethernet frames, depending upon the particular coding scheme adopted. Thus, the threshold level is determined by measuring the data in "longest Ethernet frames" from the bottom of the buffer. Given pause frame will be initiated when the buffer is filled to the threshold level even though the buffer may be currently manipulating a frame. Generally, when a buffer is receiving data, it will be receiving frames of variable length so will probably, at any given time, contain many more frames than 4 or 6. Thus, a plurality of frames may be considerably less than a longest Ethernet frame in which case a much greater number than 4 or 6 of such frames may be stored in a given buffer.

The need for a buffer, such as buffer A, to have at least storage capacity able to hold 2 longest Ethernet frames above a predetermined threshold level may be derived by the following consideration. Referring to FIG. 4, consider the situation wherein buffer A is currently receiving a frame. As soon as buffer A is filled to the threshold level (measured to the nearest byte), buffer monitor 416 decides at that point to send the pause frame to Ethernet switch 103 via signal lines 421/415 as soon as possible to prevent frame store A from overfilling and losing data. However, a frame being transmitted from a buffer (such as buffer B in this example) cannot be interrupted in the middle and thus if there is a frame currently being transmitted from buffer B, then buffer monitor 416 must be delayed in effecting transmission of a pause frame from pause frame store 420 until buffer B has completed its current transmission. Even though the decision is made at the time that the threshold point in buffer A is reached, the frames being received by buffer A must be accepted until the pause frame transmitted from pause frame store 420 takes effect in Ethernet switch 103. When the pause frame received by switch 103 takes effect, switch 103 effectively stops transmitting frames to buffer A. This is why there must be enough storage in buffer A for 2 maximum length Ethernet frames above the threshold point; because at the decision point buffer B may have just started transmitting the maximum length Ethernet frame to Ethernet switch 102, so buffer monitor 416 has to wait for this to complete before effecting transmission of the pause frame. When the Ethernet switch 103 receives the pause frame, it may have just started sending a maximum length Ethernet frame to buffer A and thus switch 103 will have to wait until it has completed its transmission of said longest Ethernet frame before pausing.

It is to be understood by those skilled in the art that the invention is not to be considered limited to any particular given configuration of the aforementioned buffers, but that the above configurations are found to provide optimum performance and optimum usage of memory space available. Usage of memory space is particularly crucial if the rate control means is to be configured upon an application specific integrated circuit (ASIC).

The invention claimed is:

1. A method of using a synchronous digital multiplexer unit for controlling flow of frame based data transmitted from a local frame based data channel interface over a synchronous digital network, comprising steps of:
    receiving said frame based data at a first rate;
    configuring a buffer to receive said frame based data;
    predetermining a data amount threshold level for said buffer;
    with respect to said threshold level, monitoring an amount of said transmitted frame based data that has been received; and in response to said step of monitoring said amount of said data received, generating a signal, wherein said signal is configurable to adapt said first rate of transmission from said frame based data channel interface, to a second rate.

2. The method according to claim 1, wherein said data is received directly from an Ethernet local area network.

3. The method according to claim 1, wherein said network comprises a synchronous digital hierarchy (SDH) network.

4. The method according to claim 1, wherein said network comprises a SONET network.

5. The method according to claim 1, wherein said step of receiving said frame based data comprises receiving one or more pause frames generated by a local area network switch.

6. The method according to claim 1, wherein said buffer comprises data storage locations configurable to store at least one data frame.

7. The method according to claim 1, wherein said buffer comprises a size equal to a number of maximum length Ethernet frames, said number being selectable from a set comprising 4 and 6.

8. The method according to claim 1, wherein said buffer is configured as a first in first out (FIFO) queue.

9. The method according to claim 1, wherein said buffer is configured as a circular buffer.

10. The method according to claim 1, wherein said step of monitoring said amount of transmitted frame based data received, comprises determining if said amount is less than said threshold level.

11. The method according to claim 1, wherein said signal is generated and sent to said local interface if said amount of said frame based data received is not less than said threshold level.

12. The method according to claim 1, wherein if said amount of said frame based data received is not less than said threshold level, then a decision to generate said signal is made substantially immediately.

13. The method according to claim 1, wherein if said amount of said frame based data is not less than said threshold level then said signal is transmitted to said local interface upon another frame, currently being transmitted to said local interface, being completed.

14. The method according to claim 1, wherein said signal comprises a pause frame specifying a predetermined time interval for inhibiting further transmissions from said local frame based data channel interface.

15. The method according to claim 1, wherein said buffer comprises, above said threshold level, an amount of data storage capacity equal to the size of two maximum length Ethernet frames.

16. A method of using a synchronous digital multiplexer unit for controlling flow of frame based data, received from a synchronous digital network, to a frame based data channel interface, comprising steps of:
receiving said frame based data at a first rate;
configuring a buffer to receive said frame based data;
predetermining a data amount threshold level for said buffer;
with respect to said threshold level, monitoring an amount of said frame based data received; and
in response to said step of monitoring said amount of said data received, generating a signal, wherein said signal is configurable to adapt said first rate of transmission of said frame based data from said synchronous digital network to a second rate.

17. The method according to claim 16, wherein said network comprises a synchronous digital hierarchy network.

18. The method according to claim 16, wherein said network comprises a SONET network.

19. The method according to claim 16, wherein said step of receiving said frame based data comprises receiving one or more pause frames.

20. The method according to claim 16, wherein said buffer comprises data storage locations configurable to store at least one data frame.

* * * * *